US011273969B2

(12) United States Patent
Peterka et al.

(10) Patent No.: US 11,273,969 B2
(45) Date of Patent: Mar. 15, 2022

(54) PEELABLE ABSORBENT FOOD PACKAGE

(71) Applicant: Bemis Company, Inc., Neenah, WI (US)

(72) Inventors: Matthew C. Peterka, Neenah, WI (US); Otacilio T. Berbert, Oshkosh, WI (US)

(73) Assignee: BEMIS COMPANY, INC., Neenah, WI (US)

(*) Notice: Subject to any disclaimer, the term of this patent is extended or adjusted under 35 U.S.C. 154(b) by 1644 days.

(21) Appl. No.: 14/095,312

(22) Filed: Dec. 3, 2013

(65) Prior Publication Data

US 2014/0255561 A1    Sep. 11, 2014

Related U.S. Application Data

(60) Provisional application No. 61/774,705, filed on Mar. 8, 2013.

(51) Int. Cl.
| | | |
|---|---|---|
| *B65D 81/26* | (2006.01) | |
| *B65D 81/34* | (2006.01) | |
| *B32B 27/12* | (2006.01) | |
| *B32B 27/32* | (2006.01) | |
| *B32B 5/26* | (2006.01) | |

(Continued)

(52) U.S. Cl.
CPC ............ *B65D 81/264* (2013.01); *B32B 5/022* (2013.01); *B32B 5/26* (2013.01); *B32B 27/12* (2013.01); *B32B 27/32* (2013.01); *B32B 27/36* (2013.01); *B65D 81/3461* (2013.01); *B32B 2262/0253* (2013.01); *B32B 2262/062* (2013.01); *B32B 2307/726* (2013.01); *B32B 2439/70* (2013.01)

(58) Field of Classification Search
CPC .. B65D 81/264; B65D 81/3461; B32B 5/022; B32B 27/12; B32B 27/32; B32B 27/36; B32B 5/26; B32B 2262/0253; B32B 2439/70; B32B 2307/726; B32B 2262/062
See application file for complete search history.

(56) References Cited

U.S. PATENT DOCUMENTS

| | | | |
|---|---|---|---|
| 4,865,854 A | | 9/1989 | Larson |
| 4,935,276 A | * | 6/1990 | Pawlowski .......... B65D 81/264 426/107 |

(Continued)

FOREIGN PATENT DOCUMENTS

| | | | |
|---|---|---|---|
| JP | 10237405 A | * | 9/1998 |
| WO | 9312990 | | 7/1993 |

OTHER PUBLICATIONS

ASTM International. ASTM D1238-13 Standard Test Method for Melt Flow Rates of Thermoplastics by Extrusion Plastometer. West Conshohocken, PA: ASTM International, 2013. Web. Sep. 22, 2016. <http://dx.doi.org/10.1520/D1238>.*

(Continued)

*Primary Examiner* — Michael C Miggins

(57) ABSTRACT

The present invention provides a peelable microwavable food package capable of absorbing undesired liquids released from packaged food products during storage, display, or heating, including microwave cooking. The present invention provides a peelably sealed microwavable food package in any packaging format including pouches, flow-wrap, horizontal form fill seal (HFFS), vertical form fill seal (VFFS), gas-flushed, vacuum-packaged, sealed rigid plastic containers and the like.

14 Claims, 2 Drawing Sheets

(51) Int. Cl.
*B32B 27/36* (2006.01)
*B32B 5/02* (2006.01)

(56) References Cited

U.S. PATENT DOCUMENTS

| | | | | |
|---|---|---|---|---|
| 5,023,121 A | * | 6/1991 | Pockat | B32B 27/08 428/36.9 |
| 5,096,722 A | * | 3/1992 | Bair | B65D 81/264 426/107 |
| 5,213,900 A | * | 5/1993 | Friedrich | B32B 27/34 428/474.4 |
| 5,382,391 A | * | 1/1995 | Juhl | B65D 81/34 264/470 |
| 5,635,261 A | * | 6/1997 | Georgelos | B32B 27/08 428/35.4 |
| 5,667,863 A | | 9/1997 | Cullen et al. | |
| 7,081,498 B2 | | 7/2006 | Moeller et al. | |
| 7,141,770 B2 | | 11/2006 | Zafiroglu et al. | |
| 7,276,269 B2 | * | 10/2007 | Kraimer | B32B 27/08 426/243 |
| 7,387,205 B1 | | 6/2008 | Wilson | |
| 7,771,812 B2 | | 8/2010 | Beu et al. | |
| 2003/0049476 A1 | * | 3/2003 | Su | B32B 27/32 428/515 |
| 2004/0163973 A1 | * | 8/2004 | Longo | B65D 81/264 206/204 |
| 2005/0004541 A1 | * | 1/2005 | Roberts | B32B 5/28 604/367 |
| 2008/0199577 A1 | | 8/2008 | Jensen et al. | |
| 2012/0012578 A1 | | 1/2012 | Hach | |
| 2012/0114808 A1 | * | 5/2012 | Cichowski | B65D 75/366 426/113 |

OTHER PUBLICATIONS

Masumi_JP10237405 (Translation).*
NPL_OrientedFilms (Ebnesajjad et al. ("Chapter 4." Plastic Films in Food Packaging: Materials, Technology and Applications, by Sina Ebnesajjad, William Andrew, 2013, pp. 53-56.) (Year: 2013).*

* cited by examiner

PEELABLE ABSORBENT FOOD PACKAGE

RELATED APPLICATIONS

This application claims the benefit of U.S. Provisional Application No. 61/774,705, filed Mar. 8, 2013, which is incorporated herein by reference in their entirety.

FIELD OF THE INVENTION

The present invention relates to microwavable food packages and particularly, to peelable moisture and/or grease absorbent microwavable food packages.

BACKGROUND OF THE INVENTION

Foods such as bacon or sausage packaged in hermetically sealed containers that contain a large amount of water and solid grease can cause problems when cooked in a microwave oven. Water in such foods is vaporized by heating the food and condenses on contact with the packaging materials. Solid grease becomes liquefied upon heating. Water and melted grease may collect at the bottom of the package causing the food item to become soggy and appear unsightly. Controlling the undesired liquids that form within a food package during storage, display and/or heating of foods can play an important role by improving safety and shelf life of foods as well as enhancing aesthetics and controlling sogginess/over-dryness during heating. As convenience foods become more prevalent, microwaveable food packaging that enhances the flavor, texture and/or appearance of the food being heated is highly desirable. Also, maintaining freshness of packaged food is increasingly important since packaging, distribution and point of sale locations are increasingly more distant.

Absorbent food pads and films are described, for example, in US Patent Application Publication Nos. 2008/0199577 and US2012/0114808, and U.S. Pat. Nos. 7,771,812 and 7,141,770. Food pads are often utilized to absorb excess liquids from meat or seafood that is packaged for display and fresh sale and are also used to absorb moisture and fats from frozen or fresh foods that are packaged for in-package preparation such as bacon or breakfast sandwiches.

Traditional food pads and absorbent food packages can be costly to produce and even inconvenient for assembly of the packaging system. In addition, rising food costs and commoditization of the food packaging industry has applied pressure to food and food package manufacturers to achieve the desired packaging properties with increased flexibility in manufacturing and at a reduced cost.

Another area of concern is with respect to ease of use during cooking of the food items and subsequent dispensing of the food items once cooked. Minimal manipulations by the consumer are highly desired. Easy access to the food items is highly preferred. There is a need in the art for improved microwave food heating packages that address at least some of the above concerns, and other concerns related to manufacture and use of the packages. Therefore, there is still a need for microwavable packaging materials that can provide good liquid absorption yet are easily openable and inexpensive.

SUMMARY OF THE INVENTION

The present invention provides a peelable microwavable food package capable of absorbing undesired liquids released from packaged food products during storage, display, or heating, including microwave cooking. The present invention provides a peelably sealed microwavable food package in any packaging format including pouches, flow-wrap, horizontal form fill seal (HFFS), vertical form fill seal (VFFS), gas-flushed, vacuum-packaged, sealed rigid plastic containers and the like.

The present invention provides a peelable microwavable food package having a first film having an outer sealant layer which is capable of forming a peelable seal to a non-woven fabric of cellulosic and synthetic fibers such that the peelable seal has a peel strength of at least 100 gram/inch at a temperature of 149° C. (300° F.), preferably at least 200 gram/inch at a temperature of 149° C. (300° F.), and more preferably, at least 300 gram/inch at a temperature of 149° C. (300° F.).

The present invention relates to a peelable microwavable food package having a first film having an outer sealant layer comprising a heat-sealable material capable of sealing to an outer layer of a second film comprising a non-woven fabric of cellulosic and synthetic fibers having a basis weight greater than about 24 grams per square meters, and more preferably, at least about 54 grams per square meters, and a thickness of at least 200 microns, preferably, at least 300 microns, and most preferably, at least 330 microns. The first film is a thermoformable film which is configured to define a food item receiving space.

DETAILED DESCRIPTION OF THE INVENTION

Figure 1:
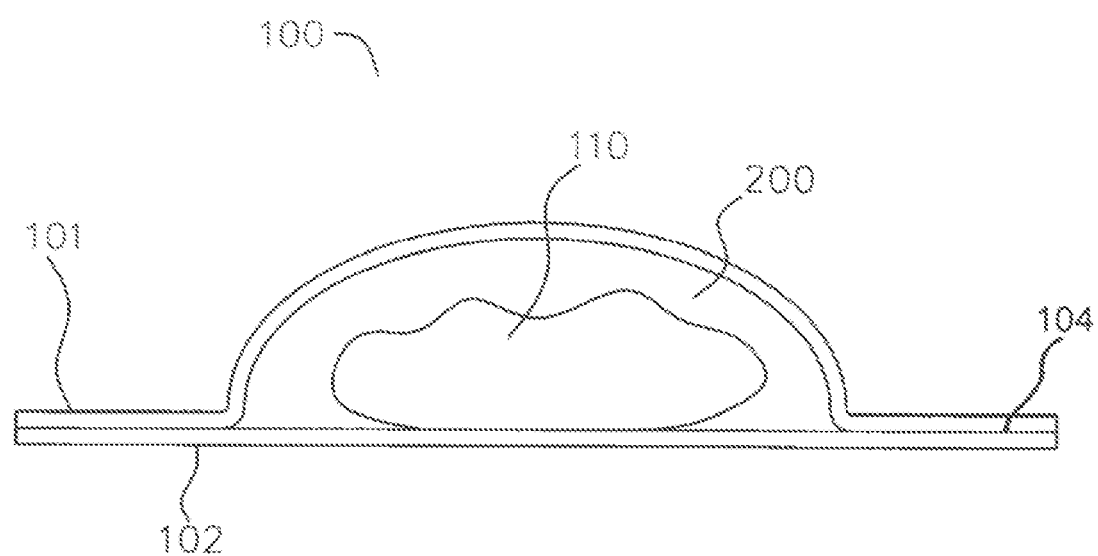
FIG. 1 is one embodiment of a feed package of the present invention.

Referring to FIG. 1, a peelable microwavable food package 100 is shown according to an exemplary embodiment. Food package 100 is suitable to contain any of a variety of food products, such as including a bread product and a meat product including, but not limited to breakfast items such as breakfast sandwiches, lunch items such as lunch sandwiches, etc., dinner items, snack items, and the like. As shown in FIG. 1, package 100 includes a food item 110 provided within the interior of container 200. Food item 110 may naturally contain moisture and/or solid grease that is released when food item 110 is heated as a result of undergoing a cooking process (e.g., microwave cooking, etc.).

According to one embodiment, peelable microwavable food package 100 includes a first film 101 and a second film 102. First film 101 is configured to define a food item receiving space 200 (e.g., a pocket, receptacle, formed portion, etc.) It will be appreciated that food item receiving space 200 may be configured to provide a space or gap (e.g., "a steam dome") about food item 110 when food item 110 is heated in a microwave oven. Second film 102 is affixed to first film 101 by the formation of a peelable heat-seal 104 which circumscribes food item receiving space 200 which includes joining first film 101 to second film 102. As shown, second film 102 is configured to define a food item platform upon which food item 110 may be positioned and whereby moisture and/or grease released from food item 110 can be absorbed therein. It will be appreciated by those skilled in the art that peelable heat-seal 104 may also provide a barrier to microorganisms and/or prevents ingress of oxygen, moisture, humidity, and any outside contaminant into the sealed package which can degrade the food item container inside package 100.

In one embodiment, the food package facilitates the cooking of food that exudes oil, grease, fat and the like during the cooking process such as bacon, sausage, or fried chicken. In another embodiment, the food package facilitates the cooking of food that releases moisture, including steam, during the cooking process such as a frozen breakfast sandwich, lunch or snack sandwich, or other food item. The food package of the present invention can further comprise features useful for microwaveable packaging systems such as venting systems, and reclosing means including re-seal strips or zippers.

Figure 2:
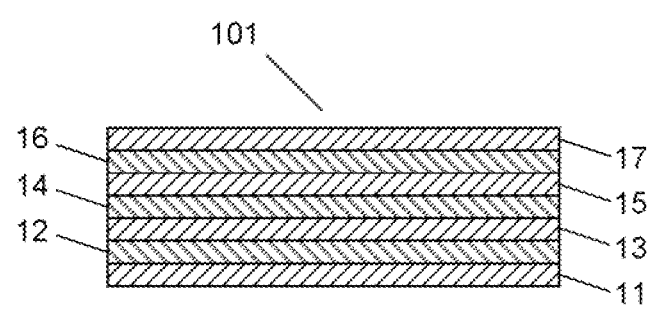
FIG. 2 is a cross sectional view of one embodiment of a multilayer first film of the present invention.

Referring to FIG. 2, one embodiment of a first film 101 is shown having seven layers. First film 101 may include any number of layers depending upon the desired functional requirements that are needed. According to the present invention, first film 101 with an outer sealant layer 11 capable of sealing to a non-woven fabric of cellulosic and synthetic fibers having a basis weight greater than about 24 grams per square meters, and more preferably, at least about 54 grams per square meters, and a thickness of at least 200 microns, preferably, at least 300 microns, and most preferably, at least 330 microns. In a preferred embodiment, the outer sealant layer 11 of the first film 101 comprises ethylene/vinyl acetate copolymer (EVA) having at least 12% (wt.) vinyl acetate content. In another preferred embodiment, the outer sealant layer 11 of the first film 101 comprises ethylene/vinyl acrylate acetate copolymer (EVA) having at least 18% (wt.) vinyl acetate content.

Preferably, the outer sealant layer 11 of the first film 101 comprises a heat-sealable material having a melt index of at least 5 V 0 min., at least 10 g/10 min., at least 15 g/10 min., or at least 20 g/10 min. as measured in accordance with ASTM D-1238 test method at 190° C./2.16 kg. In another embodiment, the outer sealant layer 11 of the first film 101 comprises a heat-sealable material having a melt index of at least 30 g/10 min. as measured in accordance with ASTM D-1238 test method at 190° C./2.16 kg.

In accordance with an important aspect of the present invention, the outer sealant layer 11 of the first film 101 comprises a heat-sealable material selected from the group consisting of acetate-based resin, acrylic acid-based resin, inonomer, ethylene/α-olefin copolymer (EAO), polyethylene more preferably, a low-density polyethylene, preferably, an ultra-low density polyethylene copolymer, and blends thereof. Preferably, the acrylic acid-based resin may comprise a material selected from the group consisting of ethylene/acrylic acid copolymer (EAA), ethylene/methacrylic acid copolymer (EMAA), and blends thereof. Preferably, the acetate-based resin may comprise ethylene/vinyl acetate copolymer (EVA), and blends thereof, Specific examples of suitable acetate-based resins include ESCORENE™ LD 734 having a melt index of 30 g/10 min, vinyl acetate content of 19.3 (wt. %), a density of 0.940 g/cm$^3$, and a melting point of 85° C., which is available from ExxonMobil Chemical Company of Houston, Tex., U.S.A.; ULTRATHENE™ UE 662-249 having a melt index of 32 g/10 min., a vinyl acetate content of 18 (wt. %), a Vicat softening point of 54° C., Which is available from Equistar Chemicals, LP of Houston, Tex., U.S.A.; and 3176 CW-3 having a melt index of 30 gf 10 min., a vinyl acetate content of 1.8 (wt. %), a density of 0.940 g/cm$^3$, and a melting point of 84° C., and a Vicat softening point of 54° C., which is available from E.I. de Pont de Nemours and Company, Wilmington, Delaware, U.S.A.

As depicted in FIG. 2, first film 101 also includes second layer 12, third layer 13, fourth layer 14, fifth layer 15, sixth layer 16, and seventh layer 17.

Figure 3:
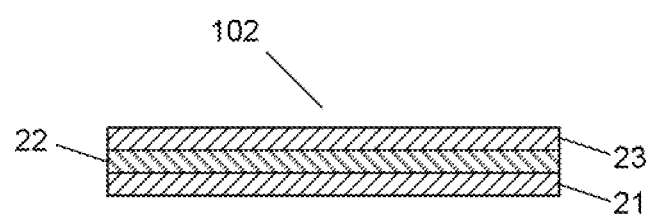
FIG. 3 is a cross sectional view of one embodiment of a multilayer second film of the present invention.

Referring to FIG. 3, the second film 102 includes an absorbent layer 21, a polymeric bonding layer 22, and a polymeric support film layer 23.

In accordance with another important aspect of the present invention, the outer layer of the second film 102 is an absorbent layer. This absorbent layer 21 is a non-woven fabric of cellulosic and synthetic fibers having a basis weight greater than about 24 grams per square meters, and more preferably, at least about 54 grams per square meters, and a thickness of at least 200 microns, preferably, at least 300 microns, and most preferably, at least 330 microns. The absorbent layer 21 is capable of absorbing water, fats, or other undesired liquids that are released by packaged food products during storage, display or heating. Toward this end, it is preferred that the absorbent layer of the second film have a water absorption capacity of at least 100%, at least 200%, at least 300%, more preferably, at least 400%, and most preferably, at least 520%.

The absorbent layer 21 can comprise one or more absorbing elements such as cellulose, synthetic fibers, paper-based materials, non-woven fabrics and polymeric materials, or combinations thereof. In one embodiment, the absorbent layer comprises a non-woven fabric of cellulosic and synthetic fibers. In one embodiment, the absorbent layer may include two or more layers, such as, for example, an inner-facing paper-based layer and a polypropylene fiber layer.

In a preferred embodiment, the absorbent layer 21 of the second film 102 comprises a non-woven fabric of cellulosic and synthetic fibers having a wet tensile strength in the transverse direction (cross direction) of greater than about 400 grams per 25 millimeters, more preferably, greater than about 1000 grams per 25 millimeters, and most preferably, at least about 1450 grams per 25 millimeters. In another preferred embodiment, the absorbent layer 21 comprises a non-woven fabric of cellulosic and synthetic fibers having a wet tensile strength in the machine direction of greater about 1000 grams per 25 millimeters, more preferably, greater than about 2000 grams per 25 millimeters, and most preferably, at least about 2600 grams per 25 millimeters.

The absorbent layer 21 of the second film 102 faces food item and absorbs moisture and/or grease released from food item during heating (e.g., exposure to microwave energy) of food item. As such, the absorbent acts to control the moisture content of food item and prevent food item from becoming too soggy (due to excessive moisture) or too dry (due to lack of moisture).

In one embodiment, second film 102 further includes a bonding layer 22 and a support layer 23 where the bonding layer 22 joins the absorbent layer 21 to the support layer. In a preferred embodiment, the bonding layer 22 comprises a non-oriented polyolefin, more preferably non-oriented polyethylene and most preferable non-oriented low density polyethylene. In a preferred embodiment, the non-oriented low density polyethylene has a melt index of at least about 3.0 grams per 10 minutes, and more preferably, at least about 3.7 grams per 10 minutes. In a preferred embodiment, the non-oriented low density polyethylene has a density of less than about 1.0 grams per cubic centimeter, and more preferably, about 0.92 grams per cubic centimeter. Commercially available of such low density include LyondellBasell® PETROTHENE NA 216-000 produced by Equistar Chemical Company, Houston, Tex.

In one embodiment, support layer 23 of the second film 102 comprises an oriented film. In a preferred embodiment, support film layer 23 has a thickness of between about 44 gauge and about 48 gauge (about 11 micron and about 12 micron). In a preferred embodiment, support film layer 23 is an oriented film of polyethylene terephthalate. In another preferred embodiment, polymeric support film layer 23 is an oriented film of polypropylene. In another preferred embodiment, polymeric support film layer 23 is an oriented film of polyamide (nylon). In still another preferred embodiment, polymeric support film layer 23 is an oriented film of cast polyamide (nylon). Commercially available oriented polyethylene terephthalate include a 48 gauge Skyrol® SP65 produced by SKC Co., Ltd., Seoul, South Korea. In one preferred embodiment, polymeric support film layer is coated with an aqueous primer to assist with bonding to bonding polymeric layer. Commercially available primers include Aquaforte® 108-W produced by Aqua Based Technologies, Northvale, N.J.

In a preferred embodiment, second film 102 has the following structure: non-woven absorbent layer/bonding layer/support film layer as shown in FIG. 3.

The following example illustrates certain particular embodiment of a first film structure suitable for use in the present invention and a comparative example. In all the following examples, resin composition percentages are based on the total weight of each film layer. In all the following examples, all film structures were produced using a single-bubble coextrusion apparatus and method which are well known to those skilled in the art. The single-bubble blown coextrusion film apparatus includes a multi-manifold circular die head for bubble blown film through which the film composition is forced and formed into a cylindrical bubble. The bubble is immediately quenched e.g., via cooled water bath, solid surface and/or air, and then ultimately collapsed and formed into a film.

EXAMPLES OF FIRST FILM

Example 1

Example 1 is one embodiment of a seven-layer blown coextruded film structure of the present invention having the following structure and layer composition as depicted in FIG.

Layer 1 ($1^{st}$ out-sealant): a blend of about 55% ethylene vinyl acetate (EVA) having 18% (wt.) vinyl acetate content (ELVAX® 3176 CW-3 from E.I. de Pont de Nemours and Company, Wilmington, Del., U.S.A.), about 30% of polyethylene methylacrylate acid copolymer (EMAA) masterbatch containing antifog additive, about 10% of ethylene vinyl acetate masterbatch containing anti-block additive and about 5% ethylene vinyl acetate masterbatch containing slip additive Layer 2: (tie) a blend of about 90% ultra-low density polyethylene (ULDPE) (ATTANE® 4201G from The Dow Chemical Company, Midland, Mich., U.S.A.) and about 10% of maleic anhydride modified polyethylene (PLEXAR® PX 3308 from Equistar Chemicals, LP of Houston, Tex., U.S.A.)

Layer 3: (barrier) a blend of about 85% nylon 6 (ULTRAMID® B36 from BASF Corporation, Mount Olive, N.J., U.S.A.) and about 15% nylon 6I/6T (DuPont SELAR® PA-3426R from E.I. du Pont de Nemours and Company, Wilmington, Del., U.S.A.)

Layer 4: (barrier) 100% of ethylene vinyl alcohol copolymer (EVOH) (SOARNOL® DT2904R from Soarus L.L.C., Arlington Heights, Ill., U.S.A.)

Layer 5: (barrier) a blend of about 85% nylon 6 (ULTRAMID® B36 from BASF Corporation, Mount Olive, N.J., U.S.A.) and about 15% nylon 6I/6T (DuPont SELAR® PA-3426R from E.I. du Pont de Nemours and Company, Wilmington, Del., U.S.A.)

Layer 6: (tie) a blend of about 90% ultra-low density polyethylene (ULDPE) (ATTANE® 4201G from The Dow Chemical Company, Midland, Mich., U.S.A.) and about 10% of maleic anhydride modified polyethylene (PLEXAR® PX 3308 from Equistar Chemicals, LP of Houston, Tex., U.S.A.)

Layer 7 ($2^{nd}$ outer): a blend of about 77% nylon 6 (ULTRAMID® B36 from BASF Corporation, Mount Olive, N.J., U.S.A.), about 15% of nylon 6I/6T6 (ULTRAMID® B36 from BASF Corporation, Mount Olive, N.J., U.S.A.) and about 8% nylon masterbatch containing anti-block and slip additives.

Comparative Example 1

Comparative Example 1 (not of the invention) is a seven-layer blown coextruded film structure having the following structure and layer composition:

Layer 1 ($1^{st}$ outer-sealant): a blend of about 88% ethylene vinyl acetate (EVA) having a 5% (wt.) vinyl acetate content (PETROTHENE® NA442-051 from Equistar Chemicals, LP of Houston, Tex., U.S.A.), about 10% polyethylene masterbatch containing antifog additive and about 2% polyethylene masterbatch containing slip additive Layer 2: a blend of about 88% ethylene vinyl acetate (EVA) having a 5% (wt.) vinyl acetate content (PETROTHENE® NA442-051 from Equistar Chemicals, LP of Houston, Tex., USA), about 10% polyethylene masterbatch containing antifog additive and about 2% polyethylene masterbatch containing slip additive Layer 3: (tie) 100% maleic anhydride modified polyethylene (ADMER® AT2118A from Mitsui Petrochemical Corporation of Tokyo, Japan)

Layer 4: (barrier) 100% of ethylene vinyl alcohol copolymer (EVOH) (SOARNOL® ET3803 from Soarus L.L.C. Arlington Heights, Ill., U.S.A.)

Layer 5: (tie) 100% maleic anhydride modified polyethylene (ADMER® AT2118A from Mitsui Petrochemical Corporation of Tokyo, Japan)

Layer 6: a blend of about 64.1% of ultra-low density polyethylene (ULDPE) (ATTANE® NG 4701G from The Dow Chemical Company, Midland, Mich., U.S.A.), about 35% of linear low density polyethylene (LLDPE) (Exxon 1001.32 from ExxonMobil Chemical Company of Houston, Tex., U.S.A.) and about 0.9% polyethylene masterbatch containing processing additives Layer 7 ($2^{nd}$ outer): a blend of about 64.1% of ultra-low density polyethylene (ULDPE) (ATTANE® NG 4701G from The Dow Chemical Company, Midland, Mich., U.S.A.), about 35% of linear low density polyethylene (LLDPE) (Exxon 1001.32 from ExxonMobil Chemical Company of Houston, Tex., U.S.A.) and about 0.9% polyethylene masterbatch containing processing additives The total thickness of the films Example 1 and Comparative Example 1 were generally from about 12.7 μm (0.5 mil) to about 254 μm (10 mil), typically from about 50.8 μm (2 mil) to about 178 μm (7 mil), most typically from about 63.5 μm (2.5 mil) to about 127 μm (5 mil).

In accordance with the present invention, Example 1 had an oxygen transmission rate of less than about 1.0 cm$^3$/100 in$^2$/24 h at 73° F., 0% RH and 1 atm (or about 15.5 cm$^3$/m$^2$/24 h at 23° C., 0% RH and 1 atm), and preferably, about 0.5 cm$^3$/100 in$^2$/24 h at 73° F., 0% RH and 1 atm (or about 7.75 cm$^3$/m$^2$/24 h at 23° C., 0% RH and 1 atm). In accordance with the present invention, Example 1 had a water vapor transmission rate less than about 1.0 g/100 in$^2$/24 h at 73° F., 90% RH and 1 atm (or about 15.5 g/m$^2$/24 h at 23° C. 90% RH and 1 atm) and preferably, about 0.5 g/100 in$^2$/24 h at 73° F. 90% RH and 1 atm for about 7.75 g/m$^2$/24 h at 23° C., 90% RH and 1 atm).

In accordance with another important aspect of the present invention, the outer sealant layer of the first is capable of peelably sealing to the outer absorbent layer of the second film to form a heat seal having a peel strength of at least 100 gram/inch at a temperature of 132° C. (270° F.), preferably, at least 100 gram/inch at a temperature of 149° C. (300° F.), more preferably at least 200 gram/inch at a temperature of 149° C. (300° F.), and most preferably, at least 300 gram/inch at a temperature of 149° C. (300° F.).

Specimens of Example 1 and Comparative Example 1 were heat sealed to the surface of a non-woven absorbent first layer of a second film (as depicted in FIG. 3). The seal strengths of the outer sealant layer of the first film to the non-woven absorbent first layer of the second film were measure between a temperature of 132° C. and 210° C. (207° F. and 410° F.). The results are illustrated in TABLE 1 below.

TABLE 1

| | SEAL STRENGTHS (grams/inch) | |
|---|---|---|
| | Example 1 | Comparative Example 1 |
| 132° C. | 105 | 0 |
| 138° C. | 342 | 0 |
| 143° C. | 229 | 0 |
| 149° C. | 367 | 0 |
| 154° C. | 857 | 75 |
| 160° C. | 834 | 172 |
| 166° C. | 920 | 357 |
| 171° C. | 1054 | 394 |
| 177° C. | 1127 | 394 |
| 188° C. | Not measured | 687 |
| 199° C. | Not measured | 1165 |
| 210° C. | Not measured | 1267 |

Specimens of Example 1 and Comparative Example 1 were heat sealed to the surface of a non-woven absorbent first layer of a second film. A cross-sectional sample of each specimen was prepared and examined under microscopic magnification. It was observed that for Example 1, the outer sealant layer of the first film penetrated through the non-woven absorbent first layer of the second film and was in contact with the adjacent bonding layer of the second film. Whereas for Comparative Example 1, the outer sealant layer of the first film did not penetrated through the non-woven absorbent first layer of the second film and was not in contact with the bonding layer of the second film. Without being bond to any particular theory, it is believed that the use of an outer sealant layer comprising ethylene/vinyl acetate copolymer (EVA) having at least 12% (wt.) vinyl acetate content and/or a melt index of at least 20 g/10 min. enhances the flow characteristics of the sealant through the non-woven (first) layer to achieve fusion bonding between the sealant layer of the first film and the bonding (second) layer of the second film. It is believed that such fusion bonding of the sealant layer of the first film to the bonding (second) layer of the second film produces higher seal strengths within a sealing temperature range of between 132° C. and 177° C. as was observed in Example 1 compared to Comparative Example 1 above.

The above disclosure is for the purpose of illustrating the present invention and should not be interpreted as limiting the present invention to the particular embodiment s described but rather the scope of the present invention should only be limited by the claims which follow and should include those modifications of what is described which would be readily apparent to one skilled in the art.

The invention claimed is:

1. A peelable microwavable food package capable of absorbing liquids released from a packaged food item, comprising:
   a. a first film comprising an outer sealant layer comprising a heat-sealable material of ethylene/vinyl acetate copolymer (EVA) comprising at least 12% (wt.) vinyl acetate content and a melt index of at least 20 g/10 min. as measured in accordance with ASTM D-1238 test method at 190° C./2.16 kg; wherein the first film defines a food item receiving space;
   b. a second film comprising an outer layer comprising an absorbent material comprising cellulose or paper-based materials and a second layer comprising a polymeric bonding material comprising a non-oriented polyethylene layer; wherein the second film defines a food item platform upon which liquids released from the food item are absorbed therein; and
   c. a peelable seal formed between the outer sealant layer of the first film and the absorbent material comprising cellulose or paper-based materials of the outer layer of the second film to enclose the food item therein and comprising a peel strength of at least 100 gram/inch at a temperature of 149° C. (300° F.) and not greater than 857 gram/inch at a temperature of 166° C. (331° F.);
   wherein the outer sealant layer of the first film comprising the heat-sealable material of ethylene/vinyl acetate copolymer (EVA) is in contact with the second layer of the second film comprising the polymeric bonding material layer, and wherein the outer sealant layer of the first film comprises the heat-sealable material of ethylene/vinyl acetate copolymer (EVA) in an amount from greater than 35% to 100% by weight of the outer layer.

2. The package of claim 1, wherein the ethylene/vinyl acetate copolymer (EVA) has a melt index of at least 30 g/10 min. as measured in accordance with ASTM D-1238 test method at 190° C./2.16 kg.

3. The package of claim 1, wherein the ethylene/vinyl acetate copolymer (EVA) has at least 18% (wt.) vinyl acetate content.

4. The package of claim 1, wherein the absorbent material has a water absorption capacity of at least 500%.

5. The package of claim 1, wherein the absorbent material has a basis weight of at least 54 grams per square meter.

6. The package of claim 1, wherein the polymeric bonding material comprises a non-oriented low density polyethylene layer.

7. The package of claim 1, wherein the peelable seal has a seal strength of at least 200 gram/inch at a temperature of 149° C. (300° F.).

8. The package of claim 1, wherein the peelable seal has a seal strength of at least 300 gram/inch at a temperature of 149° C. (300° F.).

9. The package of claim 1, wherein the absorbent material comprises cellulosic or paper-based fibers and polyolefin synthetic fibers.

10. The package of claim 9, wherein the absorbent material comprises a cellulosic or paper-based fiber layer and a polyolefin synthetic fiber layer.

11. The package of claim 9, wherein the absorbent material comprises a blend of cellulose or paper-based fibers and polyolefin synthetic fibers.

12. The package of claim 11, wherein the polyolefin synthetic fibers comprise polypropylene.

13. The package of claim 1, wherein the second film further comprises a polymeric support film and wherein the polymeric support film comprises an oriented film.

14. The package of claim 13, wherein the polymeric support film comprises an oriented film of polyethylene terephthalate, polypropylene or polyamide.

* * * * *

UNITED STATES PATENT AND TRADEMARK OFFICE
CERTIFICATE OF CORRECTION

PATENT NO. : 11,273,969 B2
APPLICATION NO. : 14/095312
DATED : March 15, 2022
INVENTOR(S) : Matthew C. Peterka and Otacilio T. Berbert It is certified that error appears in the above-identified patent and that said Letters Patent is hereby corrected as shown below:

In the Specification

Column 2, Line 30: Delete "feed" and insert -- food --, therefor.

Column 3, Line 32: After "vinyl", delete "acrylate".

Column 3, Line 36: Delete "5 V 0" and insert -- 5 g/10 --, therefor.

Column 3, Line 47: Delete "inonomer" and insert -- ionomer --, therefor.

Column 3, Line 55: After "thereof", delete "," and insert -- . --, therefor.

Column 3, Line 64: After "and", insert -- ELVAX® --, therefor.

Column 3, Line 65: Delete "30 gf 10" and insert -- 30 g/10 --, therefor.

Column 3, Line 66: Delete "1.8" and insert -- 18 --, therefor.

Column 5, Line 47: After "FIG." insert -- 2: --, therefor.

Column 7, Line 11: After "73° F." insert -- , --, therefor.

Column 7, Line 11: Delete "for" and insert -- (or --, therefor.

Signed and Sealed this
Twenty-sixth Day of December, 2023

Katherine Kelly Vidal
*Director of the United States Patent and Trademark Office*